United States Patent
Colcord et al.

(10) Patent No.: US 12,530,602 B2
(45) Date of Patent: Jan. 20, 2026

(54) SYSTEMS AND METHODS FOR SCORING USER CONVERSATION SATISFACTION

(71) Applicant: Fidelity Information Services, LLC, Jacksonville, FL (US)

(72) Inventors: Aaron David Colcord, Mequon, WI (US); Jameson Pierre Woodfin, Los Angeles, CA (US)

(73) Assignee: FIDELITY INFORMATION SERVICES, LLC, Jacksonville, FL (US)

( * ) Notice: Subject to any disclaimer, the term of this patent is extended or adjusted under 35 U.S.C. 154(b) by 1031 days.

(21) Appl. No.: 16/926,982

(22) Filed: Jul. 13, 2020

(65) Prior Publication Data

US 2021/0350257 A1 Nov. 11, 2021

Related U.S. Application Data

(60) Provisional application No. 63/020,208, filed on May 5, 2020.

(51) Int. Cl.
*G06N 5/04* (2023.01)
*G06F 16/23* (2019.01)
(Continued)

(52) U.S. Cl.
CPC ........... *G06N 5/04* (2013.01); *G06F 16/2379* (2019.01); *G06F 40/205* (2020.01); *G06N 20/00* (2019.01);
(Continued)

(58) Field of Classification Search
CPC .......... G06N 5/04; G06N 20/00; G06N 20/20; G06N 5/00; G06N 7/02; G06N 3/02;
(Continued)

(56) References Cited

U.S. PATENT DOCUMENTS 10,635,751 B1 * 4/2020 Relangi ................... G06F 40/35
11,205,196 B1 * 12/2021 Raviv ...................... H04L 51/42
(Continued)

FOREIGN PATENT DOCUMENTS

CA          3021197 A1 *  4/2019  ........ G06F 16/2246
WO  WO-2014081595 A1 *  5/2014  ............ G10L 25/48
WO  WO-2018085729 A1 *  5/2018  ........ G06F 17/2705

OTHER PUBLICATIONS

Javaid Nabi, (2018), "Machine Learning—Text Processing", Towards Data Science, p. 1-14, Sep. 2018, Retrieved from https://towardsdatascience.com/machine-learning-text-processing-1d5a2d638958 (Year: 2018).*

(Continued)

*Primary Examiner* — David Yi
*Assistant Examiner* — Nicholas Shine
(74) *Attorney, Agent, or Firm* — Finnegan, Henderson, Farabow, Garrett & Dunner, LLP (57) ABSTRACT

A system for scoring user conversation satisfaction. The system comprises one or more memory devices storing instructions, and one or more processors configured to execute instructions to perform operations. The operations comprising receiving data corresponding to a conversation between the user and a third-party service provider. The operations further comprising parsing the data into conversation subsets, and analyzing each respective subset with a first model. The operations further comprising determining a user conversation satisfaction score based on the first model analyzed subset; storing, in a database, the parsed data subsets, and the determined conversation satisfaction score; and training a second model with the data stored in the database.

20 Claims, 5 Drawing Sheets

(51) Int. Cl.
*G06F 40/205* (2020.01)
*G06N 20/00* (2019.01)
*G06N 20/20* (2019.01)
*G06Q 30/016* (2023.01)
*G06Q 30/0282* (2023.01)

(52) U.S. Cl.
CPC ......... *G06N 20/20* (2019.01); *G06Q 30/0282* (2013.01); *G06Q 30/016* (2013.01)

(58) Field of Classification Search
CPC .... G06F 16/2379; G06F 40/205; G06F 40/35; G06F 9/466; G06Q 30/0282; G06Q 30/016; G06Q 10/063; G06Q 30/0601; G06Q 30/06; G05B 13/00; G10L 15/16
See application file for complete search history.

(56) References Cited

U.S. PATENT DOCUMENTS

| | | | |
|---|---|---|---|
| 2011/0208522 A1* | 8/2011 | Pereg | G06F 40/35 704/235 |
| 2016/0055236 A1* | 2/2016 | Frank | G06F 40/35 707/748 |
| 2018/0165582 A1* | 6/2018 | Cha | H04L 51/52 |
| 2019/0147455 A1* | 5/2019 | Wang | G06F 16/24578 707/723 |
| 2019/0236130 A1* | 8/2019 | Li | G10L 15/22 |

OTHER PUBLICATIONS

Bipin Krishnan, "When and Why are batches used in machine learning?", Analytics Vidhya, Nov. 19, 2019, Retrieved from https://medium.com/analytics-vidhya/when-and-why-are-batches-used-in-machine-learning-acda4eb00763 (Year: 2019).*

Nawab et al., "Natural Language Processing to Extract Meaningful Information from Patient Experience Feedback," Appl Clin Inform. Mar. 2020;11(2):242-252. doi: 10.1055/s-0040-1708049. Epub Apr. 1, 2020. PMID: 32236917; PMCID: PMC7113005, (Year: 2020).*

* cited by examiner

SYSTEMS AND METHODS FOR SCORING USER CONVERSATION SATISFACTION

PRIORITY CLAIM

This application claims priority to U.S. App. No. 63/020,208, filed on May 5, 2020, the entire contents of which are hereby incorporated by reference in its entirety.

TECHNICAL FIELD

The present disclosure generally relates to systems and methods for scoring users' conversation satisfaction.

BACKGROUND

With advances in technology pushing financial transactions towards digital means such as online purchases, it is nearly a necessity for financial service providers ("FSPs") to turn towards data science for analyzing the vast amounts of consumer data. One processing problem FSPs face in data analytics is the contrast between the plethora of available consumer data, and FSPs lacking abilities to properly apply the data for improving the provided services. One such problematic area lies in customer support—wherein the industry is shifting away from face-to-face support centers (or even telephonic-support centers) to online support chat conversations. And in some instances, the chat is between a consumer and a chatbot. This shift creates a two-fold issue for FSPs, first, how to properly analyze the massive amounts of data streams from multiple digital sources, and second, how to regain the personal and sentimental data from an in-person customer support conversation.

There is a need for a system that connects multiple streams of conversation data from multiple consumer support entities, and that also deduces consumer sentimental satisfaction in the support conversation—regardless of the format (e.g., in-person, call-center, online chat conversation, etc.). Determining whether a consumer is satisfied with the customer support is inherently challenging for digital conversations. But a system that can determine a consumer's satisfaction—with often times just digital text data—enables merchants to scale up improvements throughout their services by understanding what satisfies the modern digital-consumer.

While some solutions exist for data analytics, such solutions typically stop there. These prior solutions fail to collect the necessary conversation data streams, fail to segment the data streams into contextual groupings, fail to further analyze the segments for consumer sentiment, and fail to determine a consumer sentiment score for an entire support conversation. There is a need for a system that collects data and integrates natural language processing algorithms with data science models as described herein.

The present disclosure provides systems and devices to solve these and other problems.

SUMMARY

In the following description, certain aspects and embodiments of the present disclosure will become evident. It should be understood that the disclosure, in its broadest sense, could be practiced without having one or more features of these aspects and embodiments. Specifically, it should also be understood that these aspects and embodiments are merely exemplary. Moreover, although disclosed embodiments are discussed in the context of a processor, it is to be understood that the disclosed embodiments are not limited to any particular industry.

Disclosed embodiments include a system for scoring user conversation satisfaction. The system comprises one or more memory devices storing instructions, and one or more processors configured to execute instructions to perform operations. The operations comprising receiving data corresponding to a conversation between the user and a third-party service provider. The operations further comprising parsing the data into conversation subsets, and analyzing each respective subset with a first model. The operations further comprising determining a user conversation satisfaction score based on the first model analyzed subset; storing, in a database, the parsed data subsets, and the determined conversation satisfaction score; and training a second model with the data stored in the database.

It is to be understood that both the foregoing general description and the following detailed description are exemplary and explanatory only, and are not restrictive of the disclosed embodiments, as claimed.

The accompanying drawings, which are incorporated in and constitute a part of the specification, illustrate several embodiments and, together with the description, serve to explain the disclosed principles. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence, nor constrained to a particular system configuration. Additionally, some of the described embodiments or elements thereof can occur or be performed simultaneously, at the same point in time, or concurrently.

Initial overviews of data science algorithms (e.g., machine learning) and natural language processing are provided below. Specific exemplary embodiments of systems and methods for scoring user conversation satisfaction follow in further detail. This initial overview is intended to aid in understanding some of the technology relevant to the systems and methods disclosed herein, but it is not intended to limit the scope of the claimed subject matter.

First, with respect to data science, there are two subfields of data science algorithms—knowledge-based systems and machine learning systems. Knowledge-based approaches rely on the creation of a heuristic, or rule-base, which is then systematically applied to a particular problem or dataset. Knowledge-based systems make decisions based on an explicit "if-then" rule. Such systems rely on extracting a high degree of knowledge about a limited category in order to virtually render all possible solutions to a given problem, these solutions are then written as a series of instructions to be sequentially followed by a machine.

Machine learning, unlike knowledge-based programming, provides machines with the ability to learn through data input without being explicitly programmed with rules. The nature of machine learning is the iterative process of using rules, and creating new ones, to identify unknown relationships to better generalize and handle non-linear problems with incomplete input data sets.

Examples of machine learning techniques include, but are not limited to decision tree learning, association rule learning, inductive logic programming, anomaly detecting, support vector machining, clustering, density-based spatial clustering, Bayesian networking, reinforcement learning, representation learning, category modeling, similarity and metric learning, spare dictionary learning, rule-based machine learning, ensemble learning, artificial neural networking, and long short-term memory networking These techniques generally are not programmed; instead, they are "taught." There are many variations for teaching— and some techniques include teaching through examples, whereas others extract information directly from the input data. Two such variants are "supervised" and "unsupervised" learning. In supervised systems, rather than anticipating every possible outcome, supervised networks attempt to characterize data by recognizing patterns. The supervised system then makes decisions based on conformity of recognized patterns with historical patterns and known attributes. A learning algorithm adjusts algorithm (i.e., weighting) factors for optimal performance based predetermined sets of correct taught stimulus-response pairs. Training supervised networks is iterative and involves repeatedly adjusting weights until the system arrives at the correct output. After training, the resulting architecture of the taught supervised network embodies the algorithm. And, unsupervised systems require no historical training data. An unsupervised network is autonomous and automatically determines data properties. Unsupervised networks factor in individual data producing events, as well as the event's relationship with other events and predetermined collective event characterizations.

Second, with respect to natural language processing ("NLP"), several embodiments herein incorporate machine learning techniques discussed above with natural language processing briefly discussed below, although, it should be noted that machine learning techniques are not the only data science programing that may be incorporated with NLP. Natural language processing relates to the interactions between computers and human languages to program algorithms for processing and analyzing natural language data. Like the techniques discussed above, NLP may be based on heuristic rules, or alternatively, it may be based on data-driven iterative statistical analysis.

While NLP may incorporate data analysis techniques, such as machine learning, to form statistical conclusions, it ultimately focuses the analysis into closely intertwined categories. These categories may include morphosyntax, semantics, discourse, speech, and cognition—all of which may factor into processing natural language.

For instance, morphosyntax algorithms may "parse" a conversation—i.e. determining the relationship between words in a sentence or building a context-free grammar tree. Alternatively, the algorithm may "stem" a conversation— i.e. deriving words to their root form (e.g. "close" is the root for "closed," "closing," "closer," etc.). Some algorithms may determine the part of speech for each word in the sentence, or in some instances, the algorithms may segment words—i.e. marking word boundaries for languages without natural grammatical boundaries (e.g. Chinese, Japanese, Thai, etc.).

Additionally, semantic algorithms may determine the computational meaning of individual words in context within the sentence; it may translate text from one natural language to another; it may determine corresponding text from printed text (e.g. optical character recognition). Some semantic algorithms may extract subject information from text data and determine general sentiment. The algorithm may disambiguate words.

Discourse algorithms may identify discourse structure of connected text and deducing the nature of relationships between sentences (e.g. elaboration, explanation, contrast, etc.). Alternatively, discourse algorithms may analyze large texts and produce readable summaries of chunks of the text.

Speech algorithms may translate audio data into text data. Or conversely, the algorithm may transform text data into audio.

Cognitive algorithms may identify conceptual metaphors for a chunk of text in order to imply the text meaning. For instance, the word "big" may imply multiple meanings within different contexts (e.g., "that is a big tree," or "tomorrow is a big day" wherein big means physically large or important). A cognitive algorithm may further assign relative measures of meanings to a word, phrase, sentence, or chunk of text (e.g. probabilistic context-free grammar analysis).

An NLP model may include portions of all the above discussed algorithms for processing natural language chunks.

Reference will now be made in detail to the disclosed embodiments, examples of which are illustrated in the accompanying drawings. Wherever convenient, the same reference numbers will be used throughout the drawings to refer to the same or like parts. Unless explicitly stated, sending and receiving as used herein are understood to have broad meanings, including sending or receiving in response to a specific request or without such a specific request. These terms thus cover both active forms, and passive forms, of sending and receiving.

The following description provides examples of systems and methods for scoring user conversation satisfaction. The arrangement of components shown in the figures is not intended to limit the disclosed embodiments, as the components used in the disclosed systems may vary.

As discussed above, some solutions exist for data analytics, such solutions typically stop there. These prior solutions fail to collect the necessary conversation data streams, fail to segment the data streams into contextual groupings, fail to further analyze the segments for consumer sentiment, and fail to determine a consumer sentiment score for an entire support conversation. There is a need for a system that collects data and integrates natural language processing algorithms with data science models as described herein.

The following embodiments provide examples of incorporating natural language processing algorithms with data science techniques in order to analyze vast sources of conversation data for deducing a user sentiment and overall satisfaction.

Figure 1:
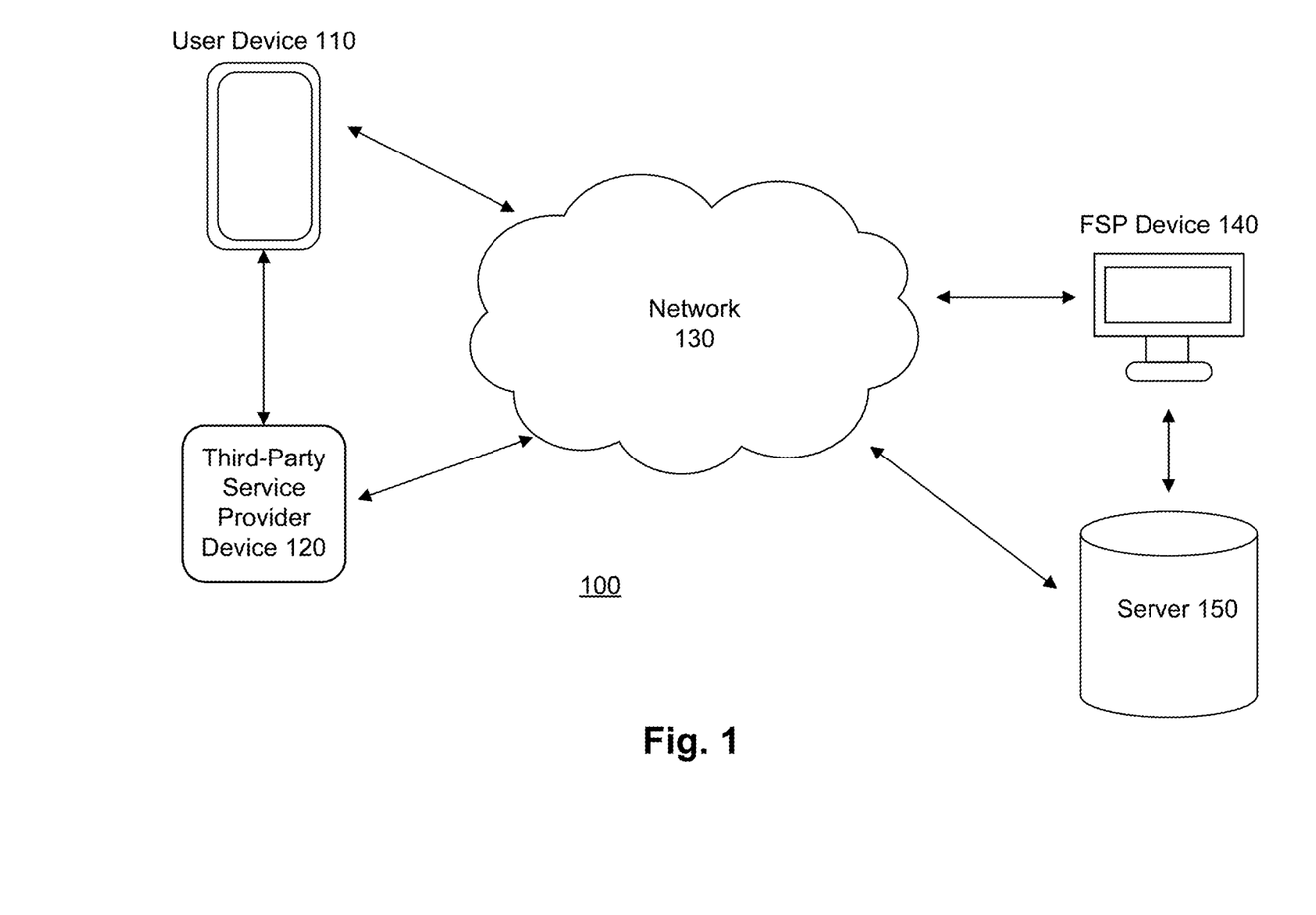
FIG. 1 is a block diagram of an exemplary user conversation satisfaction scoring system, consistent with disclosed embodiments.

FIG. 1 depicts an illustrative user conversation satisfaction scoring system 100 determining a user sentiment and conversation satisfaction. System 100 may be used by a third-party service provider to create a conversation satisfaction score for its own customer—i.e. a user—or for reviewing conversation data. Alternatively, in some embodiments, system 100 may be used by a user engaging in a recorded conversation (text or audio) with a third-party service provider in order for the user to offer feedback about the third-party customer support. In some embodiments, system 100 may be used by a FSP facilitating a financial transaction between the user and the third-party service provider to review and score customer support satisfaction. System 100 may include user device 110, third-party service provider device 120, network 130. FSP device 140, and server 150. In some embodiments, as shown in FIG. 1, each component of system 100 may be connected to network 130. However, in other embodiments, components of system 100 may be connected directly with each other without network 130.

User device 110 may include one or more computing devices configured to perform operations consistent with disclosed embodiments. For example, user device 110 may include at least one of a desktop computer, a laptop, a server, a mobile device (e.g., tablet, smart phone, etc.), a gaming device, a wearable computing device, or other type of computing device. User device 110 may include one or more processors configured to execute software stored as instructions in memory. User device 110 may implement software to perform Internet-related communication and content display processes. For instance, user device 110 may execute browser software that generates and displays interfaces, including content, on a display device included in, or connected to, user device 110. User device 110 may execute applications that allow user device 110 to communicate with components over network 130, and generate and display content in interfaces via a display device included in user device 110. The disclosed embodiments are not limited to any particular configuration of user device 110. For instance, user device 110 can be a mobile device that stores and executes mobile applications that interact with network 130 and server 150 to perform aspects of the disclosed embodiments, such as conversing with other parties, reviewing conversations, or scoring sentiment and satisfaction. In certain embodiments, user device 110 may be configured to execute software instructions relating to location services, such as GPS locations. For example, user device 110 may be configured to determine a geographic location (e.g., geo-location spatial reference coordinates) and provide location data and time stamp data corresponding to the location data. In yet other embodiments, user device 110 may capture video and/or images, or alternatively, user device 110 may play video and or audio as well as display images. User device 110 may be associated with a user attempting to purchase an item or service.

Like user device 110, third-party service provider device 120 may include one or more computing devices configured to perform operations consistent with disclosed embodiments. Third-party service provider device 120 may include similar features, components, applications, and abilities as user device 110. Where user device 110 may be associated with a user, third-party service provider device 120 may be associated with a third-party service provider offering an item for purchase or service to the user.

Network 130 may be any type of network configured to provide communications between components of system 100. For example, network 130 may be any type of network (including infrastructure) that provides communications, exchanges information, and/or facilitates the exchange of information, such as the Internet, a Local Area Network, near field communication (NFC), optical code scanner, or other suitable connections) that enables the sending and receiving of information between the components of system 100. In some embodiments, one or more components of system 100 can communicate through network 130. In various embodiments, one or more components of system 100 may communicate directly through one or more dedicated communication links.

FSP device 140 may include one or more computing devices configured to perform operations consistent with disclosed embodiments. Like user device 110, FSP device 140 may include at least one of a desktop computer, a laptop, a server, a mobile device (e.g., tablet, smart phone, etc.), a gaming device, a wearable computing device, or other type of computing device. FSP device 140 may include one or more processors configured to execute software stored as instructions in memory. FSP device 140 may implement software to perform Internet-related communication and content display processes. For instance, FSP device 140 may execute browser software that generates and displays interfaces, including content, on a display device included in, or connected to, FSP device 140. FSP device 140 may execute applications that allow FSP device 140 to communicate with components over network 130, and generate and display content in interfaces via a display device included in FSP device 140. The disclosed embodiments are not limited to any particular configuration of FSP device 140. For instance, FSP device 140 can be a mobile device that stores and executes mobile applications that interact with network 130 and server 150 to perform aspects of the disclosed embodiments, such as creating conversation satisfaction scores or reviewing conversation data. In certain embodiments, FSP device 140 may be configured to execute software instructions relating to location services, such as GPS locations. For example, FSP device 140 may be configured to determine a geographic location and provide location data and time stamp data corresponding to the location data. In yet other embodiments, FSP device 140 may capture video and/or images, or alternatively, FSP device 140 may play video and/or audio as well as display images. FSP device 140 may be further associated with user device 110, or alternatively, FSP device 140 may be associated with a financial such as a bank, a credit card company, an investment company, or any other entity which handles financial transactions for users and/or third-party service providers.

Server 150 may include one or more computing devices configured to provide data to one or more of user device 110, third-party service provider device 120, network 130, or FSP device 140. In some respects, such data may include user account data such as username, email, password, or other such registration information. Alternatively, in alternative embodiments, such data may include information pertaining to a conversation, conversation data, or a pending transaction. Such data may include stored algorithms for NLP and or machine learning models discussed herein, or such data may include compiled applications discussed herein. Server 150 may include, for example, one or more Oracle™ databases. Sybase™ databases, or other relational databases or non-relational databases, such as Hadoop™ sequence files, HBase™, or Cassandra™. Server 150 and the database(s) may include computing components (e.g., database management system, database server, etc.) configured to receive and process requests for data stored in memory devices of the database(s) and to provide data from the database(s). While server 150 is shown separately, in some embodiments server 150 may be included in or otherwise related to one or more of user device 110, third-party service provider device 120, network 130, and/or FSP device 140.

It is to be understood that the configuration and boundaries of the functional building blocks of system 100 have been defined herein for the convenience of the description. Alternative boundaries can be defined so long as the specified functions and relationships thereof fire appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
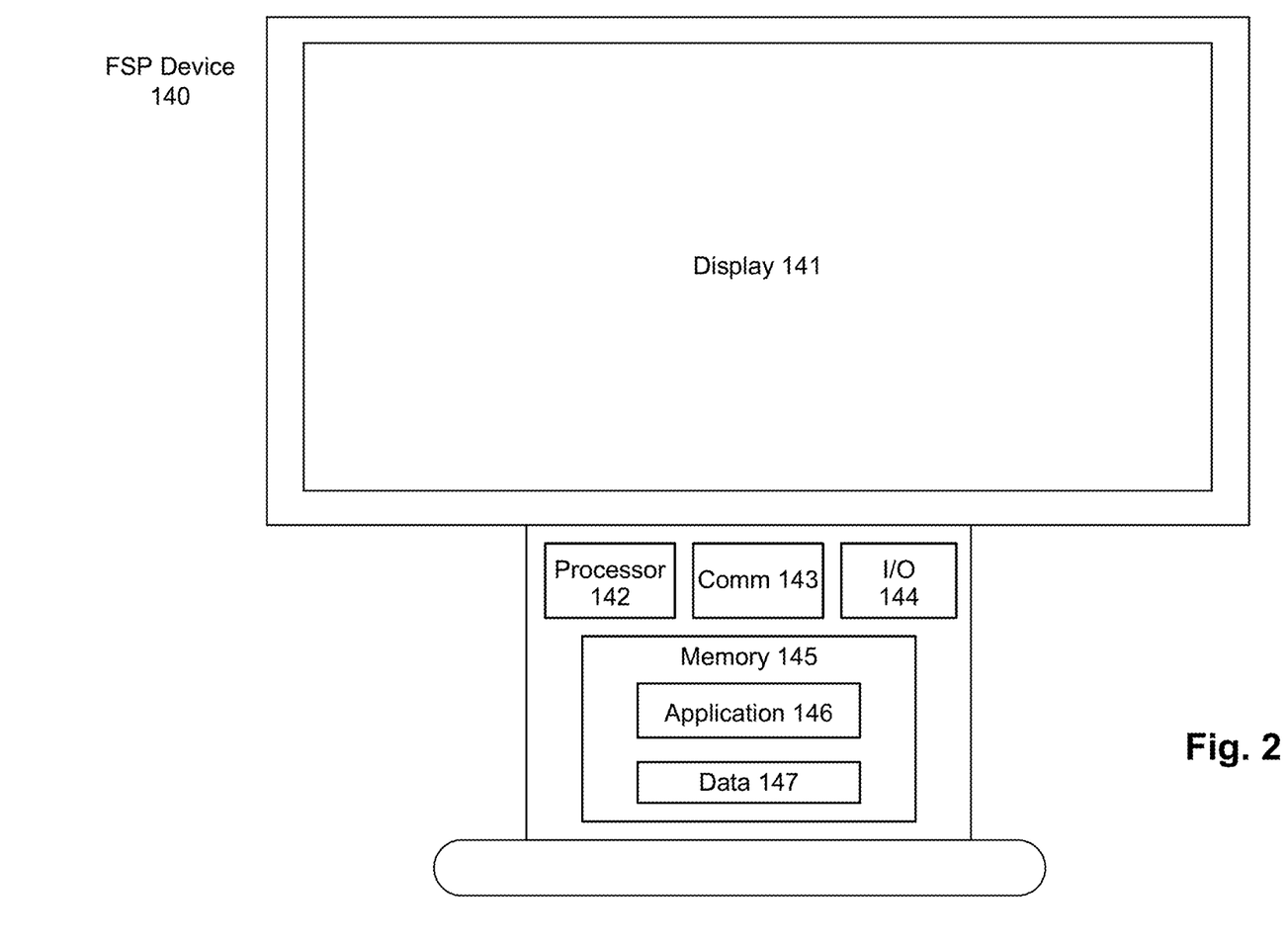
FIG. 2 is a diagram of an exemplary financial service provider device, consistent with disclosed embodiments.

FIG. 2 illustrates an exemplary configuration of FSP device 140, consistent with disclosed embodiments. Variations of FSP device 140 may be used to implement portions or all of each of the devices of system 100. Likewise, even though FIG. 2 depicts FSP device 140, it is understood that devices associated with user device 110, third-party service provider device 120, network 130, and server 140 may implement portions illustrated by exemplary FSP device 140. As shown, FSP device 140 may include a display 141, one or more processors 142, a communication device 143, an input/output ("I/O") device 144, and a memory 145 having stored therein one or more program applications 146, and data 147. One or more of display 141, processor(s) 142, comm(s) 143, I/O devices 144, or memory 145 may be connected to one or more of the other devices depicted in FIG. 2. Such connections may be accomplished using a bus or other interconnecting device(s).

Display 141 may be a screen device configured to display information to a third-party service provider agent. Alternatively, in some embodiments display 141 may display information to a user.

Processor 142 may be one or more known processing devices, such as a microprocessor from the Pentium™ or Atom™ families manufactured by Intel™, the Turion™ family manufactured by AMD™, the Exynos™ family manufactured by Samsung™, or the Snapdragon™ family manufactured by Qualcomm™. Processor 142 may constitute a single core or multiple core processors that executes parallel processes simultaneously. For example, processor 142 may be a single core processor configured with virtual processing technologies. In certain embodiments, processor 142 may use logical processors to simultaneously execute and control multiple processes. Processor 142 may implement virtual machine technologies, or other known technologies to provide the ability to execute, control, run, manipulate, store, etc., multiple software processes, applications, programs, etc. In another embodiment, processor 142 may include a multiple-core processor arrangement (e.g., dual, quad core, etc.) configured to provide parallel processing functionalities to allow FSP device 140 to execute multiple processes simultaneously. One of ordinary skill in the art would understand that other types of processor arrangements could be implemented that provide for the capabilities disclosed herein.

Comm 143 may include one or more devices capable of communicating wirelessly. As per the discussion above, one such example is an antenna wirelessly communicating with network 130 via cellular data, Wi-Fi, or near-field communication. Comm 143 may further communicate with server 150 through any wired and wireless means. Comm 143 may also include devices capable of sensing the environment around FSP device 140. In some embodiments, comm 143 may include, for example, a position sensor, or a microphone. In addition, comm 143 may include devices for detecting location, such as, a Global Positioning System (GPS), a radio frequency triangulation system based on cellular or other such wireless communication and/or other means for determining FSP device 140 location.

I/O devices 144 may include one or more devices enabling FSP device 140 to receive input from a user, a third-party service provider, or a FSP agent, and provide feedback to the respective party. I/O devices 144 may include, for example, one or more buttons, switches, speakers, microphones, or touchscreen panels. Additionally, I/O devices 144 may include in some embodiments augmented reality sensors and or augmented reality eyewear.

Memory 145 may be a volatile or non-volatile, magnetic, semiconductor, tape, optical, removable, non-removable, or other type of storage device or tangible (i.e., non-transitory) computer-readable medium that stores one or more program applications 146, and data 147. Program applications 146 may include, for example, a natural language processing application as described above a data analysis model application as described above, or other applications. Program application 146 may additionally or alternatively include an ensemble application configured to perform the operations and methods consistent with those described herein, including FIGS. 3-5.

Program application 146 may also include operating systems (not shown) that perform known operating system functions when executed by one or more processors. By way of example, the operating systems may include Microsoft Windows™, Unix™, Linux™, Apple™, or Android™ operating systems, Personal Digital Assistant (PDA) type operating systems, such as Microsoft Windows CE™, or other types of operating systems. Accordingly, disclosed embodiments may operate and function with computer systems running any type of operating system. FSP device 140 may also include communication software that, when executed by processor 142, provides communications with network 130, such as Web browser software, tablet, or smart handheld device networking software, etc. FSP device 140 may be a device that executes mobile applications for performing operations consistent with disclosed embodiments, such as a tablet, mobile device, or smart wearable device.

Data 147 may include, for example, user personal information, account information, and display settings and preferences. In some embodiments, account information may include items such as, for example, an alphanumeric account number, account label, account issuer identification, an ID number, and any other necessary information associated with a user and/or an account associated with a user, depending on the needs of the user, entities associated with network 130, and/or entities associated with system 100.

FSP device 140 may also store data 147 in memory 145 relevant to the examples described herein for system 100. One such example is the storage of user device 110 communication data such as text chunks and/or time and location stamps. Data 147 may contain any data discussed above relating to scoring the user satisfaction for a given conversation data set. For example, in some embodiments, data 147 may contain data relating to user device 110 itself such as location, IP addresses, account history, email history. Data 147 may contain data relating to third-party service provider device 120 itself such location, IP addresses, account history, email history. Data 147 may comprise conversation session data, or a stream of data pertaining to a conversation. Data 147 may be in audio or text format. Alternatively, data 147 may contain user data such as identification data, account data, and log-in information, etc. Data 147 may comprise parsed chunks of conversation session data.

In certain embodiments, FSP device 140 may include a power supply, such as a battery (not shown), configured to provide electrical power to FSP device 140.

Figure 3:
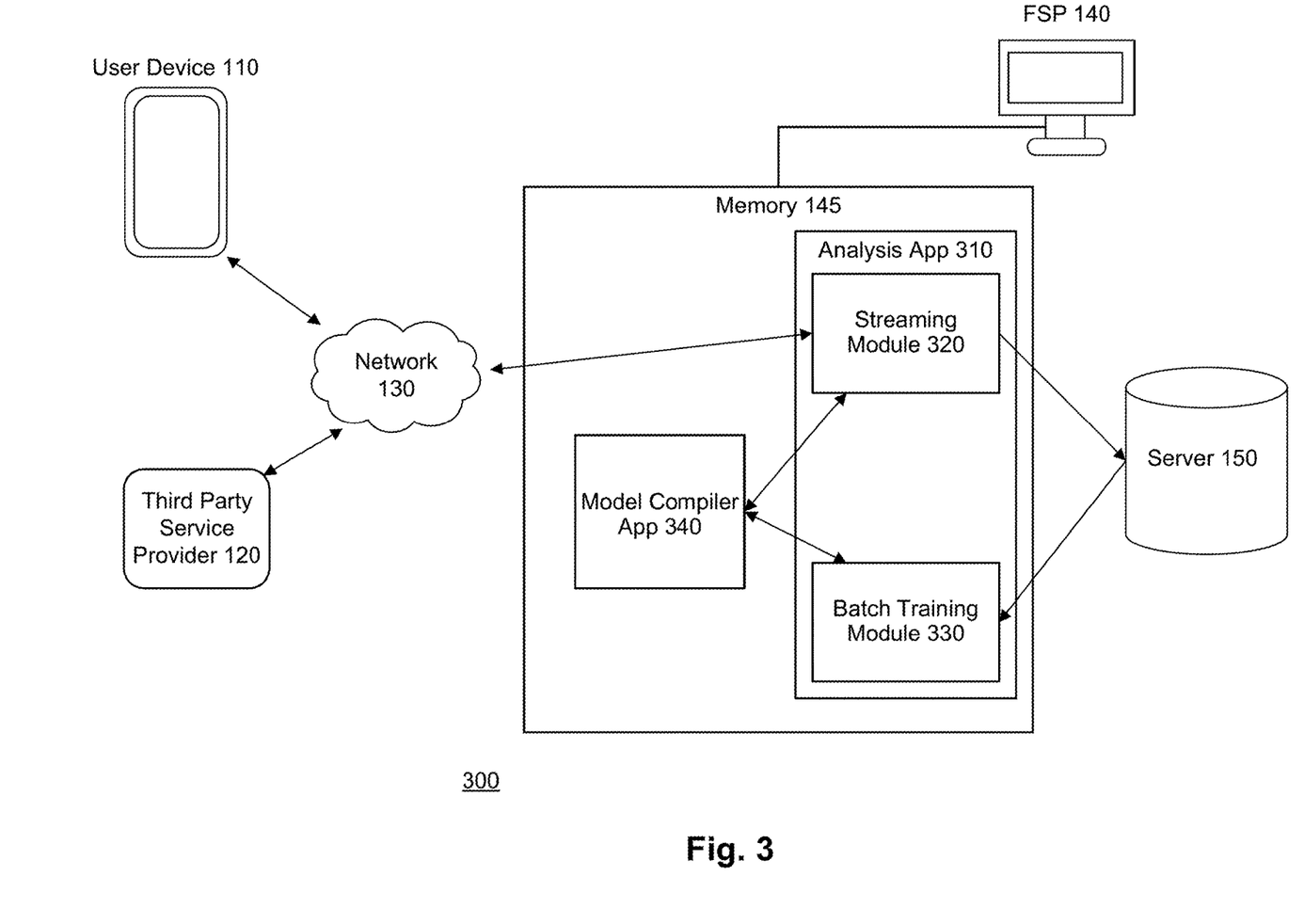
FIG. 3 is a diagram of an exemplary user conversation satisfaction scoring system, consistent with disclosed embodiments.

FIG. 3, like FIG. 1, depicts an illustrative user conversation satisfaction scoring system 300 determining a user sentiment and conversation satisfaction. System 300 may be used by a customer to create a conversation satisfaction score or for reviewing conversation data. Alternatively, in some embodiments, system 300 may be used by a user engaging in a recorded conversation (text or audio) with a customer or a third-party service provider. In some embodiments, system 300 may be used by a FSP facilitating a financial transaction between the user and the third-party service provider. System 300 may include user device 110, third-party service provider device 120, network 130, FSP device 140, and server 150. In some embodiments, as shown in FIG. 1, each component of system 300 may be connected to network 130. However, in other embodiments, components of system 300 may be connected directly with each other without network 130.

Additionally, FSP device 140 may include memory 145 with analysis application 310 and model compiler application 340. Analysis application 310 may comprise NLP linguistic algorithms, data analysis machine learning algorithms, or both. Analysis application 310 may further comprise of streaming module 320 and batch training module 330. FSP device 140 may receive conversation data streams from user device 110 or third-party service provider device 120 through means described above, and further detailed in FIGS. 4-5. For instance, in some embodiments, system 300 may receive user conversation data—from sources such as Amazon Kinesis Firehose™, and/or Apache Spark Streaming™ to name a few—as a continuous stream. Alternatively, system 300 may receive conversation data from another entity or intermediary.

System 300 may analyze the conversation data flow (e.g. a continuous or segmented stream of conversation data), with streaming module 320. Streaming module 320 may break the conversation stream data into segments based on the above discussed NLP techniques. For instance, streaming module 320 may parse the stream into grammatically recognized words, phrases, sentences, paragraphs, conversation lines, etc. Alternatively, streaming module 320 may tag parts-of-speech, stem, word segment, perform OCR, disambiguate, or perform other such NLP techniques on the data stream in order to break it into segments. As discussed in FIG. 5, streaming module 320 may break the conversation stream into features, such as conversation features, temporal features, and device features.

In some embodiments, after analyzing the data stream with streaming module 320, system 300 may send the data segments to a storage device such as server 150, alternatively, in some embodiments, system 300 may send the data segments to batch training module 330.

Batch training module 330 may receive conversation data segments from a storage device, such as server 150, or it may receive the data directly from streaming module 320. System 300 may analyze the conversation data segments with machine learning techniques in order to characterize the conversation stream and score the user sentiment. Alternatively, in some embodiments, batch training module 330 may run with an existing model as described above. And in some embodiments, the batch training module 330 model may incorporate known frameworks and languages such as Apache Spark™, Python™, and/or Scala™.

In some embodiments, system 300 may perform an iterative cycle between streaming module 320, server 150, and batch training module 330 wherein it collects conversation data through pre-trained NLP linguistic models from streaming module 320, stores all the collected data at server 150, and uses the stored data to teach the machine learning models associated with batch training module 330. For instance, in some embodiments, system 300 may train a machine learning model at the batch training module 330 with stored data, then compile another ensemble model with model compiler application 340 based on the trained machine learning model from module 330. Then system 300 may load the ensemble model from compiler application 340 with customer-specified features at the streaming module 320 for updated conversation data stream segmenting. As way of example, in some embodiments, system 300 may train batch training module 330 with an interpreted language (e.g., Python™), save the resulting model, and then load streaming module 320 with a functional, object orientated language (e.g., Scala™), though in some embodiments other language paradigms may be substituted.

Figure 4:
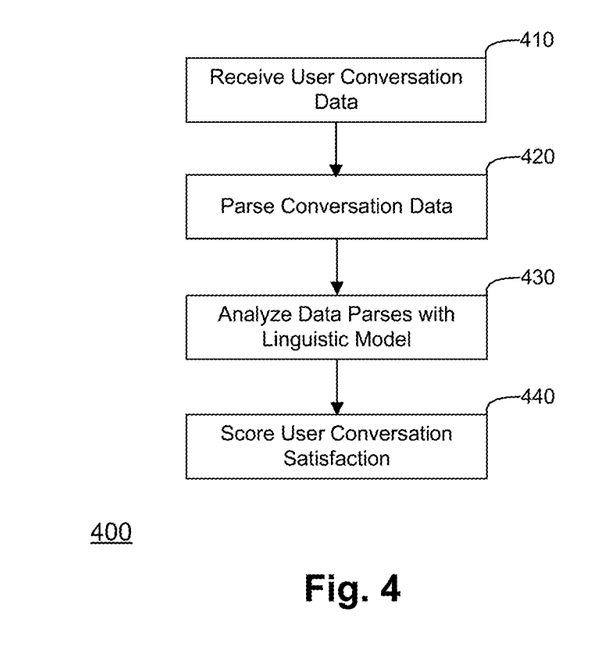
FIG. 4 is a flowchart of an exemplary user conversation satisfaction scoring method.

FIG. 4 is a flow chart of an exemplary method for scoring the user conversation satisfaction. It will be further understood by one skilled in the art that method 400 may be performed by a processing device such as user device 110, third-party service provider device 120, or FSP device 140, or alternatively, by server 150.

Method 400 begins at step 410 by receiving data pertaining to a user conversation stream. The received data may be in audio formal or text format. Method 400 may receive the conversation stream data with any of the discussed devices herein such as user device 110, third-party service provider device 120, or FSP device 140. The conversation stream data may be from a conversation between entities associated with the devices, such as a user, a third-party service provider, or an FSP. The data stream may already be segmented, or alternatively, the received data may be multiple streams for multiple users and/or multiple conversations. The data stream may be continuous containing multiple separate conversations for each respective user, or alternatively, for multiple users. The data may be received from an applet and graphical user interface ("GUI") connected directly with the user or routed through another entity associated with network 130. For instance, in some instances, the data may be received from FSP device 140 processing the conversation stream; or alternatively, the data may be received from a support call center processing a user inquiry. The data may be stored through processes discussed herein.

At step 420, method 400 parses the received conversation data by identifying grammatical spaced segments in the conversation stream and determining the relationship between the segments. The segments may lie individual words, phrases, sentences, or paragraphs. Method 400 may perform the parsing with any of the above discussed devices. In some embodiments, a separate application may parse the conversation data. Alternatively, and as discussed further with step 430, a model application may perform both steps 420 and 430.

At step 430, any device described herein performing method 400 analyzes the data parses with a linguistic model. The linguistic model may be a model based on any of the above described NLP algorithms. The linguistic model may be pre-trained, for instance it may comprise at least one of a known NLP library source such as those produced by Natural Language Analysis with Python NLTK, TextBlob, John Snow LABS, Stanford University, etc. Alternatively, the linguistic model may not be pro-trained, rather, it may be a machine learning model as described above.

The linguistic model may analyze each parsed segment from step 420, or it may analyze select parses in order to determine a sentiment score. In these embodiments, the determined sentiment may be simplistic (i.e. a good conversation experience vs. a bad conversation experience), or alternatively, it may be complex and lie on a range of qualitative sentiments (i.e. between poor and excellent). And, at step 420, the linguistic model may determine quantitative values for these sentiments. For instance, the model may produce a variety of data analysis scales indicating whether each analyzed parse carries a negative or positive sentimental weight. The model may determine the sentiment of a specific parse on a quantitative linear scale (e.g., between −1 to +1), on a binary scale (e.g., negative or positive), and/or on an incremental scale (e.g., 0, 1, 2, 3, 4). The model may analyze per parsed segment—by word, phrase, sentence, paragraph, etc. It will be further understood that the data parses may be analyzed with multiple linguistic models simultaneously.

At step 440, any device performing method 400 scores the user conversation satisfaction based on the parsed linguistic model analysis from step 430. For instance, a device composing the model application may combine all the parsed analysis and determine, on the whole, whether the user had a negative or positive experience during the conversation. A final sentiment score may be determined by combining all the parsed analysis for each respective parsed segment. The combined final sentiment score may be a sum of multiple linguistic model determined sentimental weights, or it may be a sum of multiple parsed conversation determined sentimental weight segments. Alternatively, in some embodiments, the combined final sentiment score may be based on weighted scores wherein each parsed segment is multiplied by a weight factor and then combined. One skilled in the art will realize that the final sentiment score combination technique may be changed and updated based on an iterative process and new conversation stream data.

Figure 5:
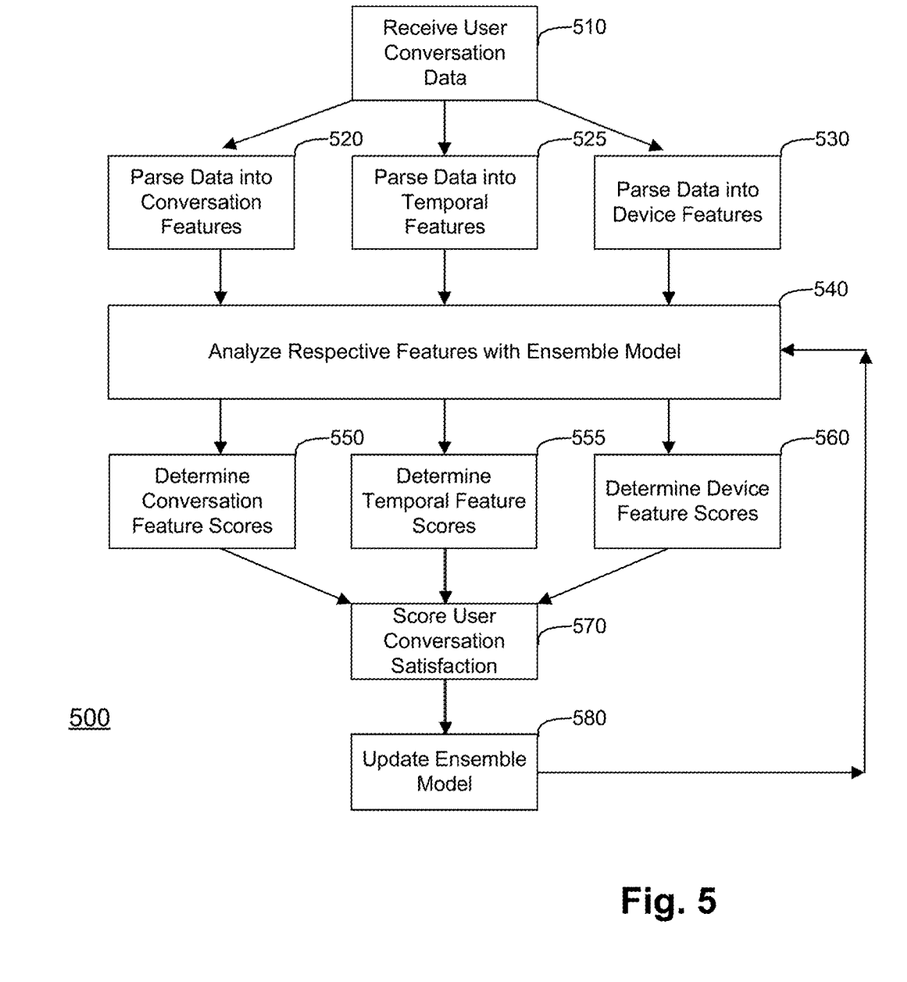
FIG. 5 is a flowchart of an exemplary user conversation satisfaction scoring method.

FIG. 5 is an alternative and in-depth embodiment of the method discussed in FIG. 4. It will be further understood by one skilled in the art that method 500 may be performed by a processing device such as user device 110, third-party service provider device 120, or FSP device 140, or alternatively, by server 150.

Method 500 begins at step 510 by receiving data pertaining to a user conversation stream. The received data may be in audio format or text format. Method 500 may receive die conversation stream data with any of the discussed devices herein such as user device 110, third-party service provider device 120, or FSP device 140. The conversation stream data may be from a conversation between entities associated with the devices, such as a user, a third-party service provider, or an FSP. The data stream may already be segmented, or alternatively, the received data may be multiple streams for multiple users and/or multiple conversations. The data stream may be continuous containing multiple separate conversations for each respective user, or alternatively, for multiple users. The data may be received from an applet and graphical user interface ("GUI") connected directly with the user or routed through another entity associated with network 130. For instance, in some instances, the data may be received from FSP device 140 processing the conversation stream; or alternatively, the data may be received from a support call center processing a user inquiry. The data may be stored through processes discussed herein.

At steps 520, 525, and 530, method 500 parses the received conversation data by identifying grammatical spaced segments in the conversation stream and determining the relationship between the segments and repeals this process for several distinct conversation features. The segments may be individual words, phrases, sentences, or paragraphs. Method 500 may perform the parsing with any of the above discussed devices. In some embodiments, a separate application may parse the conversation data. Alternatively, and as discussed further below, a model application may perform both these steps.

At step 520, devices associated with method 500 may parse the received conversation data stream by conversation features. For instance, the conversation data stream may be parsed into segments based on frequency of a user average turn length in the conversation, or alternatively, based on the third-party service provider agent average turn length in the conversation. The data stream may be parsed based on overall number of conversation turns back-and-forth between the user an agent. In some embodiments, the conversation data stream may be parsed on a conversation overall duration. In some embodiments, the conversation feature may be based on detected data stream grammatical syntax—or any of the morphosyntax, semantics, discourse, speech, and cognition categories discussed above.

At step 525, devices associated with method 500 may parse the received conversation data stream by temporal features. For instance, the conversation data stream may be parsed by the day of the week. Alternatively, in some embodiments, the conversation data stream may be parsed based on the time of the day.

At step 530, devices associated with method 500 may parse the received conversation data stream by device features. For instance, the conversation data stream may be parsed based on user device identification data, or alternatively, based on third-party service provider device identification data. In some embodiments, the conversation data stream may be parsed for each user's separate user devices (e.g., conversations from mobile device, desktop browser, etc.).

At step 540, any device described herein performing method 500 analyzes the parsed data features with an ensemble model. The ensemble model may be a combination of multiple linguistic models described above for step 430 of FIG. 4, or alternatively, it may be a combination of machine learning models described throughout here. For instance, the exact data stream may be parsed with multiple different models in order to determine multiple sentiment scores at steps 550, 555, 560. Alternatively, in some embodiments, different models may be used for different data stream sources. The ensemble model may be pre-trained or not pre-trained. Just like in step 430, the ensemble model may analyze each conversation feature parse for user sentiment throughout the conversation.

At steps 550, 555, and 560, the ensemble model may analyze each parsed feature and determine respective data feature scores. The ensemble model may incorporate linguistic algorithms that produce a variety of data analysis scales indicating whether each analyzed feature carries a negative or positive sentimental weight. For instance, the model may determine the sentiment of a specific feature on a quantitative linear scale (e.g., between −1 to +1), on a binary scale (e.g., negative or positive), and/or on an incremental scale (e.g., 0, 1, 2, 3, 4). The model may analyze per parsed segment—by word, phrase, sentence, paragraph, etc. It will be further understood that the data parses may be analyzed with multiple linguistic models simultaneously. In some embodiments, the ensemble model may analyze each parsed feature with an un-trained machine learning algorithm such that the resulting score is in the form of a classification tree or other machine learning data scores discussed above. Each respective feature (i.e. conversation feature, temporal feature, and device feature) is scored through the ensemble model—by a linguistic algorithm, a machine learning algorithm, or both.

At step 570, any device performing method 500 scores the user overall conversation satisfaction based on the determined feature scores from steps 550, 555, and 560. For instance, a device composing the ensemble model application may combine all the parsed analysis and determine, on the whole, whether the user had a negative or positive experience during the conversation. A final sentiment score may be determined by combining all the parsed analysis for each respective parsed segment and each respective feature. The combined final sentiment score may be a sum of multiple determined sentimental weights, or it may be a sum of multiple parsed conversation determined sentimental weight segments. Alternatively, in some embodiments, the combined final sentiment score may be based on weighted scores wherein each parsed segment is multiplied by a weight factor and then combined. One skilled in the art will realize that the final sentiment score combination technique may be changed and updated based on an iterative process and new conversation stream data.

At step 580, any device performing method 500 may update the ensemble model from step 540 with the determined feature scores from steps 550, 555, and 560, as well as the overall user conversation satisfaction score from step 570. It will be further understood by one skilled in the art, that for respective pre-trained linguistic models, the respective model will be updated and adjusted based on the resulting score from step 570. Alternatively, it will also be understood that for any un-trained machine learning models, the respective model will be updated and adjusted based on the resulting score from step 570 as well. For instance, as an illustrative example, one skilled in the art will understand that at step 580 an exemplary batch training model, much like batch training module 330 may be updated based on resulting scores from a streaming model, such as streaming module 320.

A person of ordinary skill will now understand that through these steps, system 100 further facilitates the goal of scoring user conversation satisfaction for a given conversation stream. By utilizing numerous sources of data, system 100 may further assist the FSP, user, or third-party service provider by providing analytics and information pertaining to consumer satisfaction.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The elements in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit being indicated by the following claims and their full scope of equivalents.

What is claimed is:

1. A system for scoring user conversation satisfaction, comprising:
   one or more memory devices storing instructions; and
   one or more processors configured to execute the instructions to perform operations comprising:
      receiving data corresponding to multiple conversations between a user and a third-party service provider stored based on text chunks and location stamps;
      parsing the data into conversation subsets using device features based on user device identification data;
      segmenting the conversation subsets based on at least one natural language processing technique;
      updating the segmented conversation subsets based on user-specified features;
      analyzing each respective subset with a first machine learning model;
      analyzing, using a linguistic model, a sentiment of a specific feature of the segmented conversation subsets;
      determining a user conversation satisfaction score based on a combination of the analysis of the first machine learning model and the sentiment;
      storing, in a database, the parsed data subsets, and the determined conversation satisfaction score;
      training the first machine learning model using a batch training module based on the stored data subsets;
      iteratively training a second machine learning model with the parsed data subsets, the segmented conversation subsets, new conversation subsets, and the determined user conversation satisfaction score stored in the database;
      updating the user conversation satisfaction score based on the iteratively trained second machine learning model; and
      training at least one untrained model based on the updated user conversation satisfaction score and the iteratively trained second machine learning model.

2. The system of claim 1, wherein the subsets comprise a conversation feature subset, or a temporal feature subset.

3. The system of claim 2, wherein the one or more processors are further configured to determine a feature score for each feature subset.

4. The system of claim 3, wherein the determined user conversation satisfaction score is further based on weighting of each determined feature score.

5. The system of claim 1, wherein the first and second machine learning model respectively comprise at least one of a linguistic model, an ensemble model, or a long short-term memory model.

6. The system of claim 1, wherein the processors are further configured to notify the third-party service provider of the determined conversation satisfaction score.

7. The system of claim 6, wherein the processors are further configured to execute instructions to perform operations comprising:
   notifying the user of the determined conversation satisfaction score;
   receiving an indication from the user whether the conversation satisfaction score is accurate;
   storing the received indication; and
   updating the second trained machine learning model based on the received indication.

8. The system of claim 1, wherein the one or more processors are further configured to execute instructions to perform operations comprising receiving data corresponding to a plurality of conversations between a plurality of users and the third-party service provider.

9. The system of claim 8, wherein the one or more processors are further configured to execute instructions to perform operations comprising:
receiving a second set of data corresponding with a second conversation between a second user and the third-party service provider;
updating the second trained machine learning model with the received second set of data;
receiving parameters from the second user; and
updating the first machine learning model based on the updated second trained machine learning model and the received parameters.

10. The system of claim 9, wherein the processors are further configured to determine a second user conversation satisfaction score for the second set of data corresponding with the second conversation.

11. A method for scoring user conversation satisfaction, comprising:
receiving data corresponding to multiple conversations between a user and a third-party service provider stored based on text chunks and location stamps;
parsing the data into conversation subsets using device features based on user device identification data;
segmenting the conversation subsets based on at least one natural language processing technique;
updating the segmented conversation subsets based on user-specified features;
analyzing each respective subset with a first machine learning model;
analyzing, using a linguistic model, a sentiment of a specific feature of the segmented conversation subsets;
determining a user conversation satisfaction score based on a combination of the analysis of the first machine learning model and the sentiment;
storing, in a database, the parsed data subsets and the determined conversation satisfaction score;
training the first machine learning model using a batch training module based on the stored data subsets;
iteratively training a second machine learning model with the parsed data subsets, the segmented conversation subsets, new conversation subsets, and the determined user conversation satisfaction score stored in the database;
updating the user conversation satisfaction score based on the iteratively trained second machine learning model; and
training at least one untrained model based on the updated user conversation satisfaction score and the iteratively trained second machine learning model.

12. The method of claim 11, wherein the subsets comprise a conversation feature subset, or a temporal feature subset.

13. The method of claim 12, further comprising determining a feature score for each feature subset.

14. The method of claim 13, wherein the determined user conversation satisfaction score is further based on weighting of each determined feature score.

15. The method of claim 11, wherein the first and second machine learning model respectively comprise at least one of a linguistic model, an ensemble model, or a long short-term memory model.

16. The method of claim 11, further comprising notifying the third-party service provider of the determined conversation satisfaction score.

17. The method of claim 16, further comprising:
notifying the user of the determined conversation satisfaction score;
receiving an indication from the user whether the conversation satisfaction score is accurate;
storing the received indication; and
updating the second trained machine learning model based on the received indication.

18. The method of claim 11, further comprising receiving data corresponding to a plurality of conversations between a plurality of users and the third-party service provider.

19. The method of claim 18, further comprising:
receiving a second set of data corresponding with a second conversation between a second user and the third-party service provider;
updating the second trained machine learning model with the received second set of data;
receiving parameters from the second user; and
updating the first machine learning model based on the updated second trained machine learning model and the received parameters.

20. The method of claim 19, further comprising determining a second user conversation satisfaction score for the second set of data corresponding with the second conversation.

* * * * *